US011865714B2

(12) United States Patent
Santos et al.

(10) Patent No.: US 11,865,714 B2
(45) Date of Patent: Jan. 9, 2024

(54) ROBOTIC LIMB

(71) Applicant: Samsung Electronics Company, Ltd., Suwon-si (KR)

(72) Inventors: Jose Marcel Santos, Sunnyvale, CA (US); Brian Harms, San Jose, CA (US); Thomas Brenner, Sunnyvale, CA (US); Curtis Aumiller, San Jose, CA (US); Jiawei Zhang, Sunnyvale, CA (US); Sajid Sadi, San Jose, CA (US); Pranav Mistry, Campbell, CA (US); Forrest G. Tran, Milpitas, CA (US); Tara Sriram, Sunnyvale, CA (US); Kathleen Sofia Hajash, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 357 days.

(21) Appl. No.: 16/792,088

(22) Filed: Feb. 14, 2020

(65) Prior Publication Data
US 2020/0262058 A1 Aug. 20, 2020

Related U.S. Application Data

(60) Provisional application No. 62/957,904, filed on Jan. 7, 2020, provisional application No. 62/895,271, filed
(Continued)

(51) Int. Cl.
*B25J 9/12* (2006.01)
*B25J 17/00* (2006.01)
(Continued)

(52) U.S. Cl.
CPC .......... *B25J 9/12* (2013.01); *B25J 9/102* (2013.01); *B25J 9/106* (2013.01); *B25J 9/161* (2013.01);
(Continued)

(58) Field of Classification Search
CPC ..... B25J 9/12; B25J 9/102; B25J 9/106; B25J 19/0025; B25J 19/02; B25J 19/0029; B25J 9/16
See application file for complete search history.

(56) References Cited

U.S. PATENT DOCUMENTS 5,293,107 A * 3/1994 Akeel .................. B25J 19/0029
310/83
5,459,925 A * 10/1995 Akeel ...................... B25J 9/102
475/344
(Continued)

FOREIGN PATENT DOCUMENTS

CN 104786233 B 7/2015
KR 20180010220 A 1/2018

OTHER PUBLICATIONS

International Search Report and Written Opinion for International Application No. PCT/KR2020/007212, dated Sep. 10, 2020.
(Continued)

*Primary Examiner* — Jake Cook

(57) ABSTRACT

An apparatus for a robotic limb includes one or more limb segments connected via one or more joints. The robotic limb may feature one or more dual-reduction quasi-quasi-direct-drive joint actuators that permit the robotic limb to move throughout a scene. The robotic limb may further include an end-effector connected to a free end of the robotic limb with one or more opposable fingers comprising a four bar linkage. The end-effector may include a main actuator that actuates the one or more fingers via the four-bar linkages to complete various tasks.

18 Claims, 6 Drawing Sheets

Related U.S. Application Data on Sep. 3, 2019, provisional application No. 62/895,413, filed on Sep. 3, 2019, provisional application No. 62/895,344, filed on Sep. 3, 2019, provisional application No. 62/806,902, filed on Feb. 17, 2019.

(51) Int. Cl.

| | | |
|---|---|---|
| *B25J 13/08* | (2006.01) | |
| *B25J 19/02* | (2006.01) | |
| *B25J 15/10* | (2006.01) | |
| *B25J 15/02* | (2006.01) | |
| *B25J 9/10* | (2006.01) | |
| *B25J 9/16* | (2006.01) | |

(52) U.S. Cl.
CPC ........... *B25J 13/088* (2013.01); *B25J 15/022* (2013.01); *B25J 15/10* (2013.01); *B25J 17/00* (2013.01); *B25J 19/02* (2013.01)

(56) References Cited

U.S. PATENT DOCUMENTS

| | | |
|---|---|---|
| 10,730,186 B2 | 8/2020 | Sami |
| 2006/0150753 A1 | 7/2006 | Massimo |
| 2013/0331744 A1* | 12/2013 | Kamon ................ A61H 1/0266 601/35 |
| 2018/0133905 A1* | 5/2018 | Smith .................. B25J 17/0241 |
| 2018/0133906 A1* | 5/2018 | Smith .................. B25J 17/0241 |
| 2018/0194000 A1 | 7/2018 | Fraser |
| 2018/0215050 A1* | 8/2018 | Kassow ............... B25J 17/0241 |
| 2018/0340800 A1* | 11/2018 | Goto .................... G01D 5/3473 |
| 2019/0001501 A1 | 1/2019 | Christopher |
| 2020/0039064 A1 | 2/2020 | McKinley |

OTHER PUBLICATIONS

Kau, et al., "Stanford Doggo: An Open-Source, Quasi-Direct-Drive Quadruped," Department of Mechanical Engineering, Stanford University, Stanford, CA 94305 USA, 7 pages, 2019.

* cited by examiner

ROBOTIC LIMB

PRIORITY

This application claims the benefit, under 35 U.S.C. § 119(e), of U.S. Provisional Patent Application No. 62/957,904, filed 7 Jan. 2020, U.S. Provisional Patent Application No. 62/895,413, filed 3 Sep. 2019, U.S. Provisional Patent Application No. 62/895,271, filed 3 Sep. 2019, U.S. Provisional Patent Application No. 62/895,344, filed 3 Sep. 2019, and U.S. Provisional Patent Application No. 62/806,902, filed 17 Feb. 2019, which are incorporated herein by reference.

TECHNICAL FIELD

This disclosure generally relates to apparatuses for robotic systems.

BACKGROUND

Robotic systems are used in a variety of applications. For example, robots are utilized in various commercial and industrial applications such as (1) automotive and aircraft manufacturing, (2) medical surgery, and (3) chemical and pharmaceutical synthesis, among others. Robotic systems maintain a distinct advantage over human labor in some applications as they provide cheap, consistent labor that can repeat a task with a higher degree of precision than a human laborer, for example in hazardous environments.

Robotic systems often require some user input for successful operation. Under one input method, the robotic system is directly piloted in real-time by a human actor, usually through remote control, to complete the task. This is common for tasks that still require human judgment but are difficult for a human to perform due to the nature of the environment. Examples include medical surgeries, welding, or chemical synthesis involving hazardous chemicals. Under another input method, the robotic system is programmed, usual via software, to complete and repeat a task without consistent human oversight. The ability of the robotic system is thus limited by the nature of the instructions provided and the fidelity of the components used. This input method predominates in robotic systems that complete and repeat simple tasks, often in industrial, manufacturing, and residential environments.

DESCRIPTION OF EXAMPLE EMBODIMENTS

Figure 1:
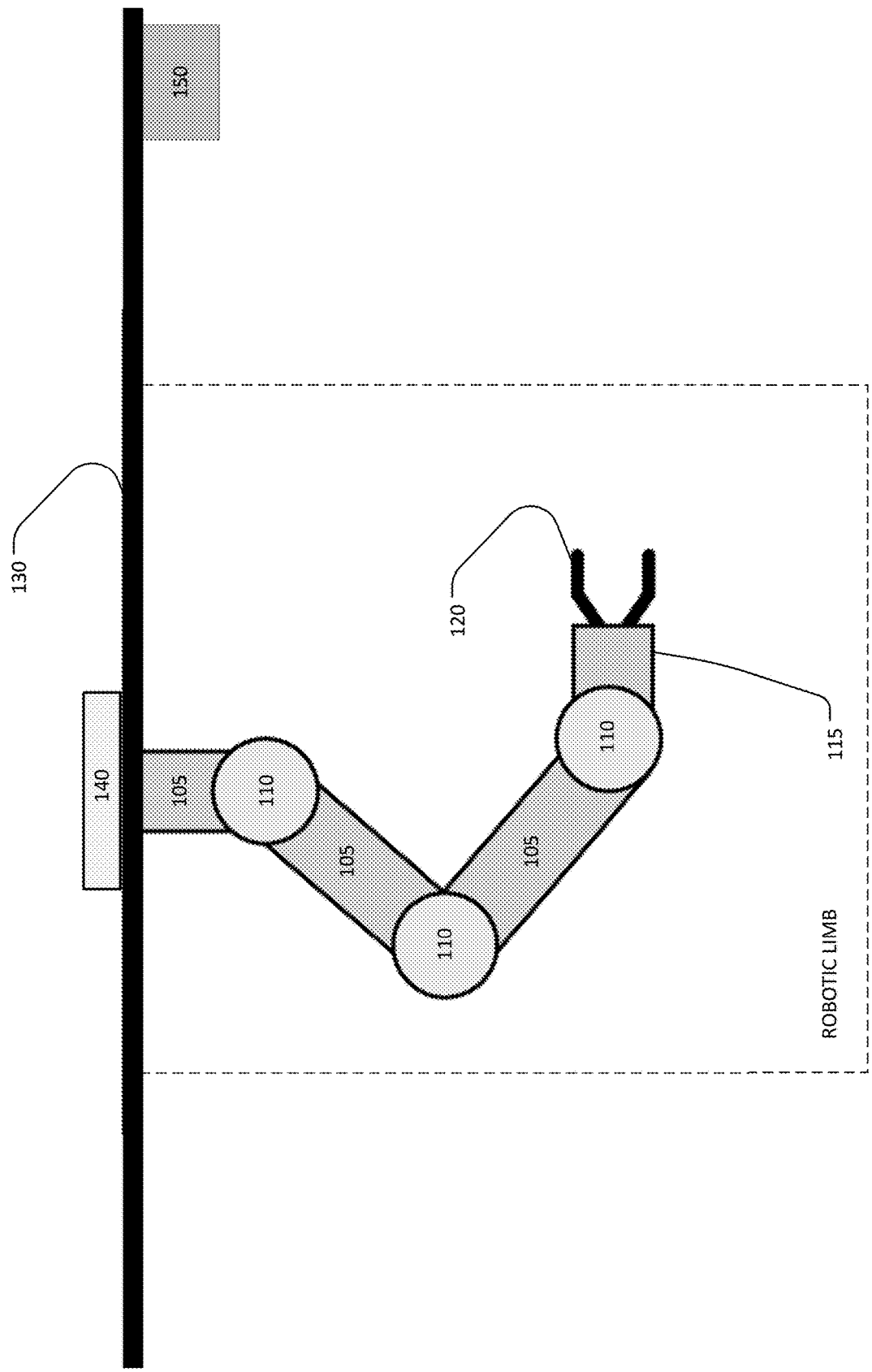
FIG. 1 illustrates an example robotic limb and apparatus.

This disclosure relates to an apparatus and components of a robotic limb. FIG. 1 illustrates an example robotic limb 100. Robotic limb 100 may comprise any combination of one or more limb segments 105, joints 110, end-effectors 115, and fingers 120. In some embodiments robotic limb 100 may be connected at one end to a fixed surface 130 via mounting base 140, which may be a low-profile mounting base. In some embodiments, robotic limb 100 may be associated with one or more external sensors 150.

Figure 2:
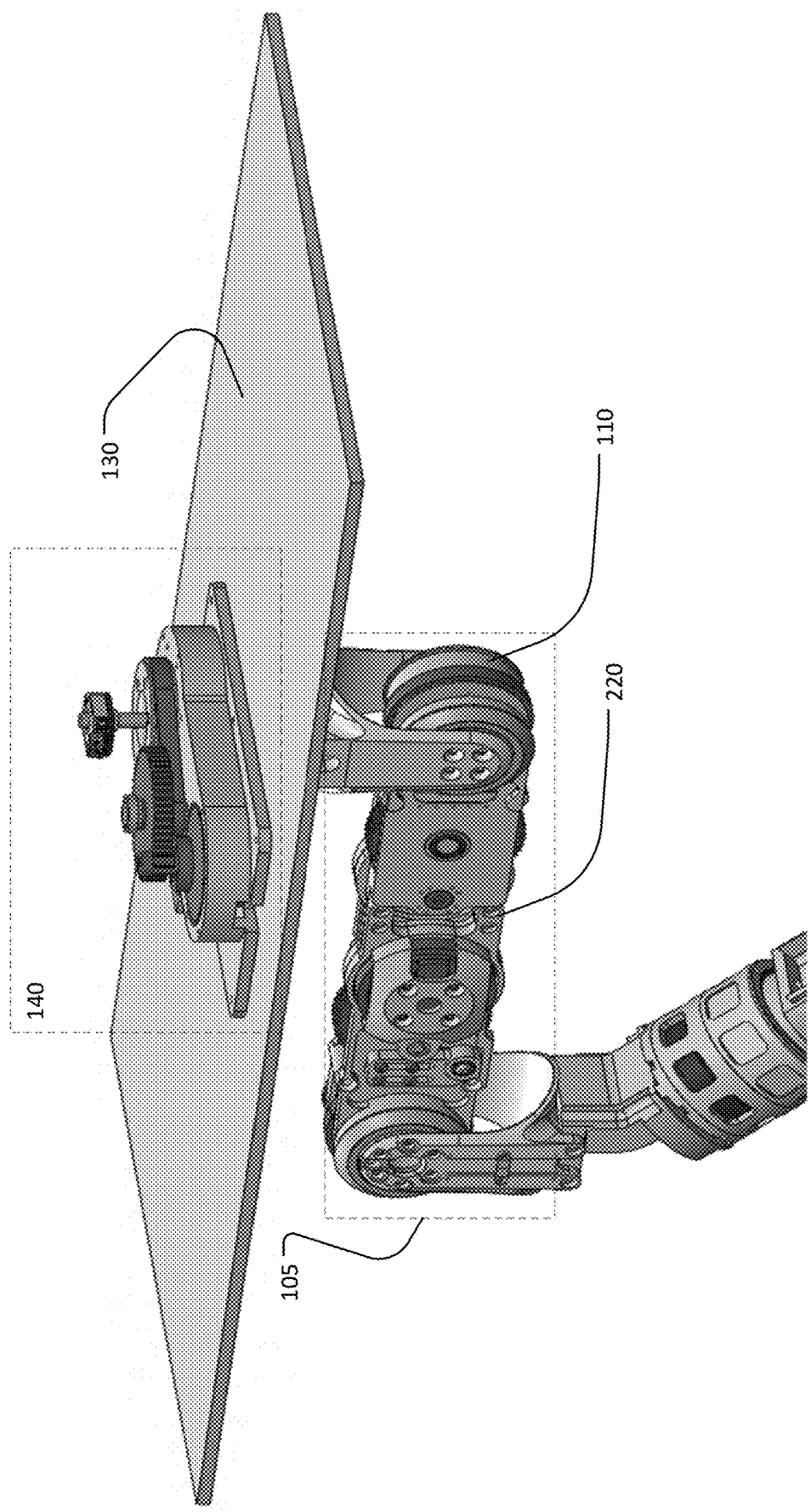
FIG. 2 illustrates an example portion of a robotic limb connected to a fixed surface.

In some embodiments robotic limb 100 may be connected at one end to a fixed or relatively fixed surface 130. FIG. 2 illustrates a robotic limb 100 mounted to a fixed or relatively fixed surface 130. For example and not by way of limitation, this fixed surface may include a table, a wall, a ceiling, a cabinet, a workbench, etc. In some embodiments robotic limb 100 may connected to fixed surface or relatively fixed surface 130 through low-profile mounting base 140. In particular embodiments, low-profile mounting base 210 can increase form factor and overall aesthetics as it increases the amount of space available to consumers. By fixing a joint 110 to a fixed or relatively fixed surface 130, the mounting base can be low-profile, reducing the amount of space required for robotic limb 100. In some embodiments, and as described more fully below, this low-profile mounting base 210 may comprise a mounted dual-reduction quasi-quasi-direct-drive (QQDD) joint actuator 220 connected to robotic limb segment 105. Many different power transmission components can be used in this joint design, for example and not by way of limitation, sprockets, gears, or spurs.

Figure 3:
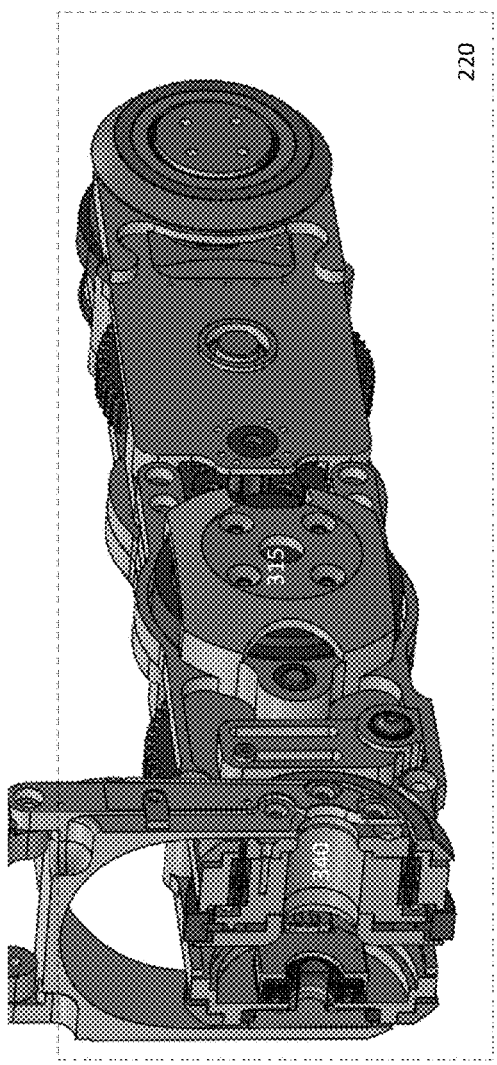
FIG. 3 illustrates an example of a robotic limb having a dual reduction quasi-quasi-direct-drive.
Figure 3:
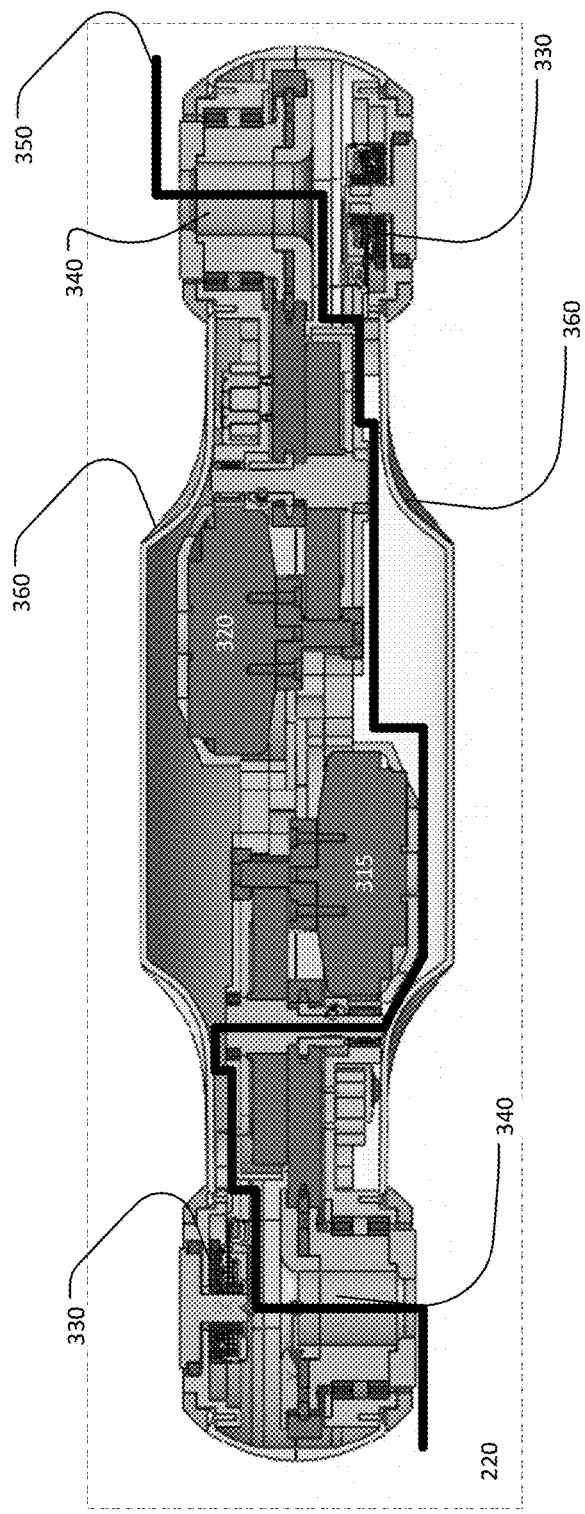

In particular embodiments, joint 110 includes a dual-reduction (QQDD) joint actuator. FIG. 3 illustrates an example QQDD. In particular embodiments, a joint 110 includes a dual-reduction QQDD joint actuator 220. QQDD 220 includes one or more torque-dense motors a first reduction 315, a second reduction 320, one or more absolute encoders 330, wire pass through 340 that enables one or more wires 350 to traverse the length of QQDD 220, and one or more limb segment shrouds 360.

Figure 4B:
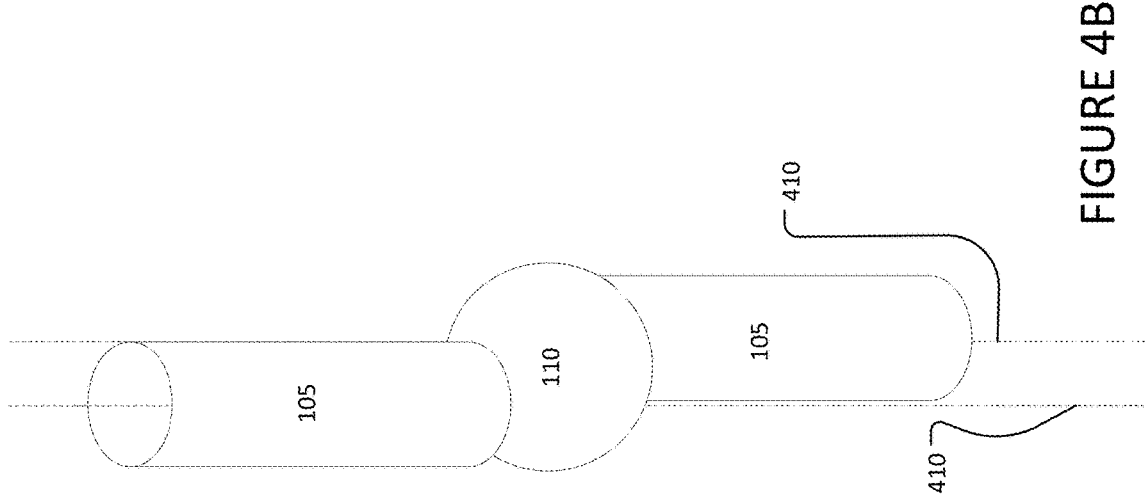
FIGS. 4A and 4B illustrate examples of connections of robotic limb segments via a joint.
Figure 4A:
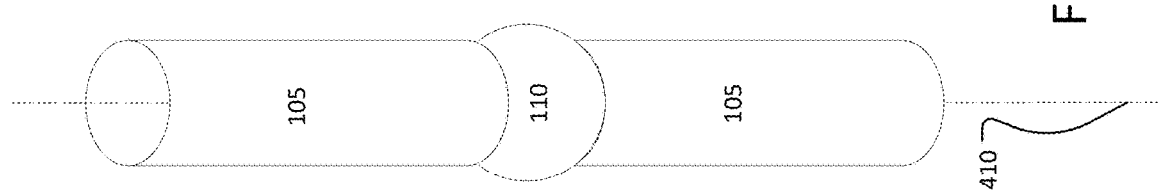

Joint 110 connects two limb segments 105 together as part of the robotic limb. FIG. 4A and FIG. 4B illustrate various connections of limb segments 105 by joint 110. In particular embodiments, joint 110 includes a rotational joint, however joint 110 may include, for example and not by way of limitation, a linear joint, an orthogonal joint, a rotational joint, a twisting joint, or a revolving joint.

In particular embodiments, joint 110 connects two limb segments 105 together in an in-line joint configuration, such that when two connected limb segments 105 are fully extended (such the two connected limb segments 105 form a straight line) they are arranged so their axial centerlines are aligned. FIG. 4A illustrates an inline connection, where the axial centerlines 410 of limb segments 105 are aligned. In particular embodiments, joint 110 connects two limb segments 105 together in an offset joint configuration, such that when two connected limb segments 105 are fully extended (such that there is 180 degrees of separation between the two connected limb segments 105) they are arranged so their axial centerlines are offset but parallel to one another. FIG. 4B illustrates an offset connection, where the axial centerlines 410 of limb segments 105 are offset but parallel to one another.

In particular embodiments, the first reduction 215 utilizes spur gears and the second reduction 220 utilizes a roller chain. However, this disclosure contemplates any variation for either first reduction 215 or second reduction 220, for example and not by way of limitation, spur gears, helical gears, herringbone gears, lantern gears, timing belt, v-belt, traditional belt, or cable.

In some embodiments, QQDD 220 includes a hollow shaft that contains one or more absolute encoders 330. The one or more absolute encoders 330 may record data regarding the robotic limb for one or more applications. In particular embodiments, the one or more absolute encoders 330 is an absolute magnetic encoder. However, this disclosure contemplates any variation for absolute encoder 330, including absolute magnetic encoders, absolute optical encoders, absolute capacitive encoders, resolvers potentiometer, gear tooth sensors, or back-EMF current sensing observers.

The QQDD 220 works to permit rotation of joint 110 as the robotic limb 100 moves throughout its environment. This QQDD may offer many advantages over traditional longitudinally mounted high reduction servo motors or quasi-direct-drive (QDD) motors used as joint actuators in robotic limbs. Example advantages are detailed herein.

Particular embodiments of the QQDDs described herein offer a combination of range of reduction and relative power density that is beneficial for robotics applications, and in particular consumer robotic applications. Traditional high-reduction servo motors are capable of producing high reduction ranges (typically between 100:1 and 500:1), high torque, and high power for variety of applications. This results in motors that are capable of bearing large loads with high precision; however, this can lead to expensive motors that are overdesigned for consumer robotics applications, where loads typically do not exceed two kilograms and precision is less critical. QDDs operate on the opposite end of the spectrum for certain attributes and may in comparison have a low reduction range (typically between 3:1 and 10:1), and low to mid-range relative power density. To achieve higher torque given their lower power, QDD's utilize a larger motor radius to produce the necessary torque for a variety of applications.

Particular embodiments of the QQDDs described herein may have attributes that fall in between those of traditional high-reduction servo motors and QDDs. For example, embodiments of the QQDDs described herein may have reduction ranges typically between 10:1 and 100:1, and relative power density in the mid to high range. Such QQDDs may be more torque-dense than traditional high reduction servo motors, and more power-dense than a QDD. Compared to conventional high reduction servo motors, these differences can result in QQDD's having high-fidelity torque measurement, permitting greater accuracy.

Particular embodiments of the QQDDs described herein provide an improvement on both traditional high reduction servo motors and QDDs by reducing the wiring requirements of the joint actuator in robotics applications. The wiring requirements on conventional high reduction servo motors and QDD robotic limbs can be extensive and can lead to exposed wiring, which is potentially unsafe for consumer products. Further, the wiring requirements of QDDs and traditional high reduction servo motors can require offset joints that are non-human like, reduce aesthetic appeal, and result in bulkier robotics (e.g., robots, robotic devices, robotic limbs, etc.).

Particular embodiments of the QQDDs described herein, when compared to QDDs, offer reduced size requirements without sacrificing reduction range or relative power density. This reduced size offers several advantages over QDDs in robotics applications. First, as explained herein, reduced size permits in-line joints and joints that are sized comparably to typical normal human joints (i.ee, a knee or elbow joint). This reduced joint size due to QQDDs increases the aesthetic appeal and reduces size requirements compared to QDD joint actuators. Second, the smaller size of QQDDs permits lower profile mounting that reduces impact on available space for the consumer in the household. Conventional high reduction servo motors and QDDs are typically space intensive, and mounting of robotic limbs via high reduction servo motors or QDDs can require bulky components that are aesthetically displeasing and reduce available space. In contrast, particular embodiments of the QQDDs described herein reduce form-factor size and permit mounting on common surfaces through low-profile bases, for example and not by way of limitation, on tables, underneath a cabinet, on work benches, and other common surfaces.

Compared to traditional high reduction servo motors for consumer robotics, particular embodiments of the QQDDs described herein improve on the form factor through fewer components, which reduces production costs. Traditional high reduction servo motors require a large number of expensive components including, for example: small, high-speed, power dense motors and high reduction gearboxes that require high part counts and small part scales; low-commodity hollow or ring form-factor rotary position sensors; and slip rings that enable power and data pass-through across moving components. Particular embodiments of the QQDDs described herein also operate at lower power and voltage relative to traditional high reduction servo motors due to their larger radius, this decreases operating costs and noise. Particular embodiments of the QQDDs described herein provide backdrivability and relatively high fidelity torque measurement through the motor.

In some embodiments, the QQDD 220 includes a wire pass-through 340. Wire pass-through 340 is a hollow shaft at each end of the QQDD 220, that runs the traverse direction at each end of QQDD 220. This wire pass-through 340 permits one or more wires 350 to run through QQDD 220, and thus limb segment 105. This design permits one or more wires 350 to remain internal to limb segment 105 through the length of the limb segment, and removes the need for a separate, external wire housing. The wire pass-through further permits the in-line connection of one or more joint segments 105 by one or more joints 110. If wire 350 did not pass through the body of the limb segment 105 then an in-line joint connection would require the addition of either a low-commodity hollow form factor (e.g., ring) joint encoder, or an external wire harness. The wire pass-through 340 thus permits, for example, reduced cost and in-line connection of one or more joint segments 105 that in turn increases form factor and aesthetics for consumers. Moreover, a wire pass-through may eliminate the need for slip rings or complex strain relief mechanisms and may permit the use of commodity, non-hollow encoders in lieu of expensive, custom designed and manufactured encoders.

In some embodiments robotic limb 100 may comprise one or more joint encoders and one or more reductions. In particular embodiments, these one or more joint encoders may record data related to robotic limb 100, including but not limited to the joint angle of one or more joints located on the robotic limb. The measured joint angles measure the angular differential between the axial centerline of each limb segment 105 at each joint 110.

In some embodiments, robotic limb 100 may be associated with one or more external sensors 150. These external sensors can include, for example and not by way of limitation, three-dimensional (3D) cameras, LIDAR, dynamic vision system (DVS), TOF sensors, fiducial markers, Optitrack, RGB cameras, or stereo RGB cameras. In particular embodiments, robotic limb 100 may be associated with one or more internal sensors 330. These internal sensors can include, for example and not by way of limitation, one or more joint encoders, computation encoders, limit switches, or motor current sensors. In particular embodiments, the present invention assesses data from one or more internal sensors 330 or one or more external sensors 150 as these are affordable and highly accurate and thus ideal for measuring distances and positions of objects. In some embodiments, data from these one more internal sensors or external sensors can be utilized to reduce the trajectory error due to the fidelity of commodity power transmission through one or more dynamic adjustments to the controller. For example and not by way of limitation, these dynamic adjustments may include gain scheduling or adjustment of proportional-integral-derivative feedback (PIDF) gains.

In some embodiments, robotic limb 100 may further comprise one or more processors and one or more computer-readable non-transitory storage media coupled to one or more of the processors. In these embodiments the one or more computer-readable non-transitory storage media may comprise instructions operable when executed by one or more of the processors to cause the apparatus to perform one or more operations. For example and not by way of limitation, these operations may include providing a positional adjustment for robotic limb 100 based on a differential between the current position of at least a portion of the robotic limb and a goal position of at least a portion of the robotic limb. The positional adjustment, positions of at least a portion of robotic limb 100, and corresponding difference between the position may be determined by any discernable method. This positional adjustment through differentials is provided as one example, and this disclosure contemplates any method for determining and executing positional adjustments in robotics applications.

FIG. 3 illustrates a specific configuration of a QQDD that permits an in-line configuration. As illustrated in FIG. 3, reduction 315's orientation is mirrored and inverted relative to reduction 320, and is arranged end-to-end with reduction 320 in the limb segment. This particular arrangement of reductions as well as wire pass-through 340 create an in-line dual-reeducation QQDD structure for a robotic limb, as another limb segment connected via the joint of either reduction can move in line with the limb segment. In particular embodiments, more than one limb segment may be arranged in a series, each containing a QQDD, such that the series of limb segments are arranged in line.

Figure 5:
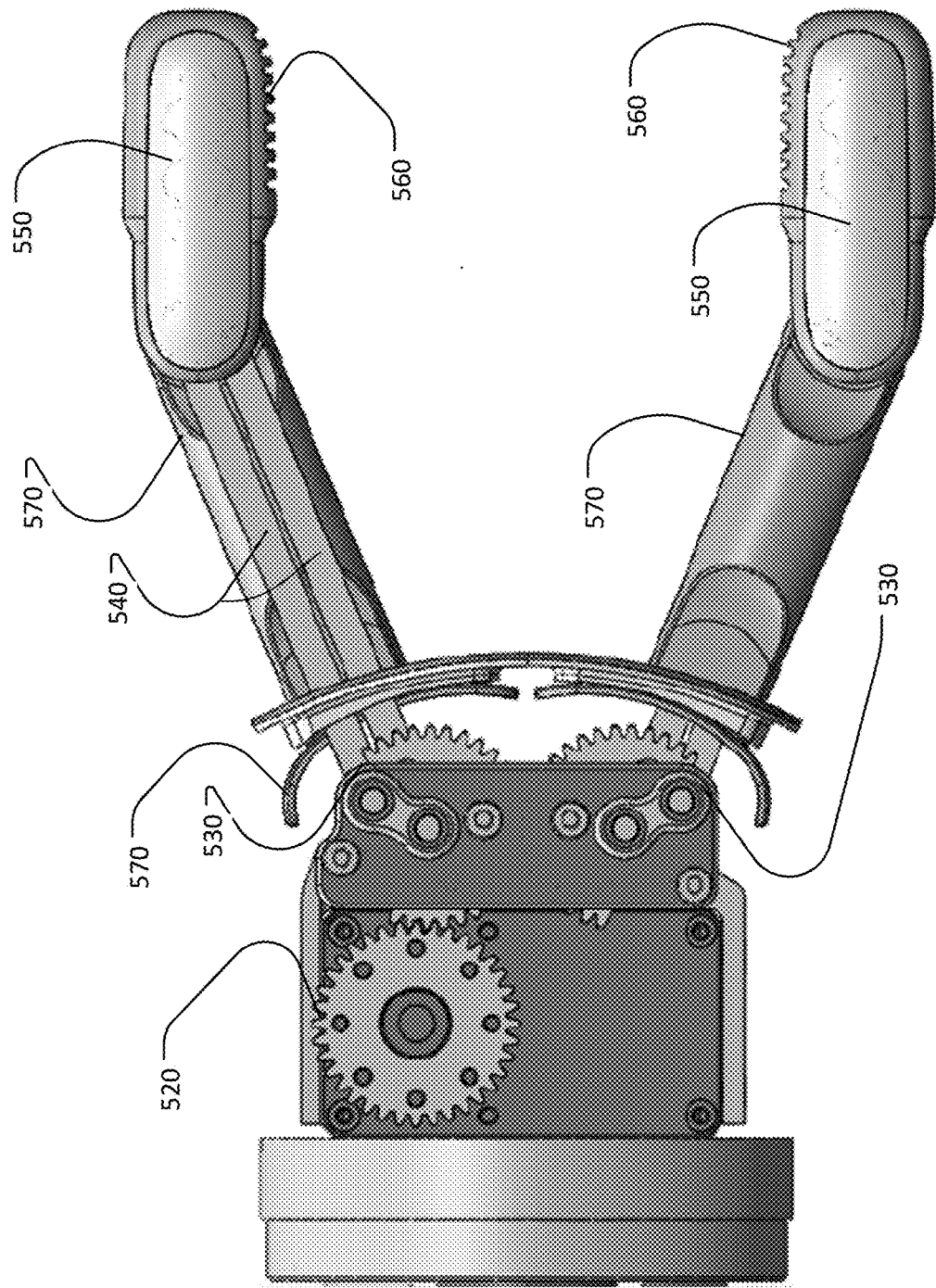
FIG. 5 illustrates an example end effector and fingers.

In some embodiments, robotic limb 100 may further include an end-effector 115 connected to the free end of the robotic limb. FIG. 5 illustrates an example end-effector. The end-effector 115 may include one or more main actuators 510 connected to one or more fingers 120 via a power transmission 520. The main actuator 510 may be powered by any suitable power sources, for example and not by way of limitation, electric, hydraulic or pneumatic power. The power transmission 520 may include any suitable components, for example and not by way of limitation, gears, chain, or linkages.

In some embodiments the main actuator may comprise one or more motors. The main actuator 510 may be connected to the one or more fingers 120 via at least one spur gear 530. Minimizing the number of actuators required to actuate the one or more fingers 120 reduces the overall cost and size of end-effector 115.

In some embodiments the fingers 120 on end effector 115 may comprise a four-bar linkage 540. The four bar linkage consists of one or more bars that form the shape of a parallelogram spanning the length of finger 120. In some embodiments the finger tips 550 of finger 120 may include a flat edge with rounded corners. In addition to providing fingers 120 a more human-like aesthetic that increases the form factor for consumers, this shape enables robotic limb 100 to grasp low-profile objects directly off a flat surface, for example and not by way of limitation, spoons, pens, cables, screws, etc. In particular embodiments finger 120 may react with the environment, producing feedback for the main actuator through, for example and not by way of limitation, information about force, position, or speed. In particular embodiments, this feedback may be internal to the main actuator, while in other embodiments the feedback may be external to the main actuator, or any combination thereof.

In some embodiments a gripping pad 560 may be coupled to a surface of at least one of the fingers 120 on end-effector 115. Gripping pad 560 may be composed of any material, for example and not by way of limitation, rubber or soft plastic. In some embodiments gripping pad 560 may be a separate component connected to one or more finger tips 550. In particular embodiments gripping pad 560 may be integrated into the one or more finger tips 550, for example and not by way of limitation, by co-molding the conductive material into the one or more finger tips 550.

In some embodiments gripping pad 560 may comprise a conductive material to be utilized in certain operations, such as interacting with a capacitive touch-screen interface as may be included in modern appliances, tablets, smartphones, or computers In some embodiments the main actuator 510 and four bar linkages 540 may be covered by one or more linkage shrouds 570. The linkage shrouds 570 are intended to cover one or more pinch points that may materialize during operation of robotic limb 100. Traditional end-effectors often feature one or more exposed mechanical components that create potential safety hazards for users. For example and not by way of limitation, exposed mechanical components on end-effectors may create one or more pinch points, a point at which it is possible for a person or part of a person's body to be caught between moving parts of a machine, or between the moving and stationary parts of a machine, or between material and any part of the machine. While acceptable in an industrial or manufacturing environment where users have minimal interaction with or wear proper protection when interacting with end-effectors, in a consumer or home environment these potential safety hazards pose a significant risk to consumers or damaging the mechanism itself. In particular embodiments the linkage shrouds comprise plastic, however this disclosure contemplates any suitable number of materials for covering one or more pinch points on end effector 115.

In some embodiments the main actuator 510 is configured to actuate one or more fingers 120 to exert a tensile or compressive force to complete a physical interaction between robotic limb 100 and one or more objects. For example and not by way of limitation, this physical interaction between robotic limb 100 and the one or more objects may include the robotic limb: grasping and holding one or more objects in a static position; grasping, moving, and subsequently releasing one or more objects from a first position in the scene to a second position within the scene; stirring contents contained within an object (such as in a coffee mug or mixing bowl); pouring the contents of one object into another object (such as pouring a volume from a bottle of vegetable oil into a mixing bowl for baking); or repeating a physical movement between objects (such as holding a hammer and repeatedly driving it into another object).

Traditional end-effectors on robotic limbs consist of multiple servo and cable systems to individually actuate one or more fingers on the end effector. These end-effectors suffer from multiple disadvantages, including high cost due to multiple components, and large housings that either must be housed outside the end-effector or increases the size of the end-effector beyond human-sized proportions. These grippers are powerful but are often designed for industrial or manufacturing settings. As a result, these same end-effectors are often over-designed for home applications and leads to decreased aesthetics and an undesirable form factor for consumer applications.

Figure 6:
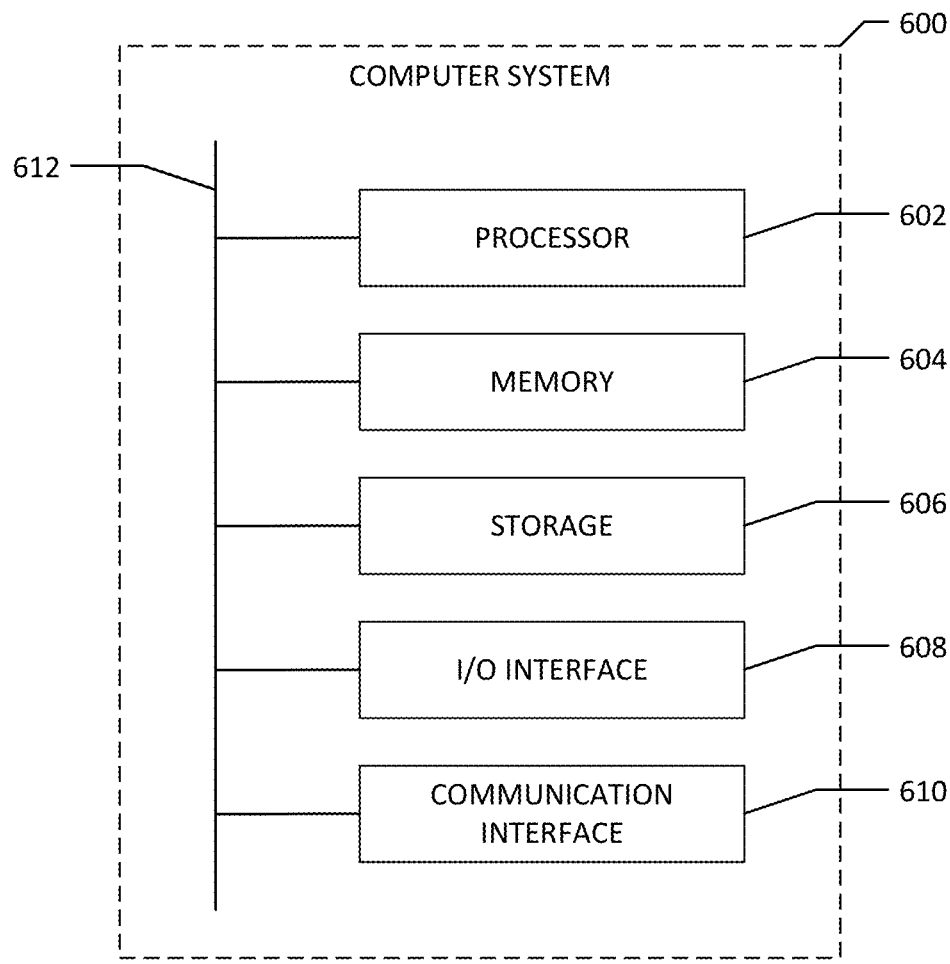
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An apparatus, comprising:
a robotic limb, comprising:
a first limb segment;
a second limb segment; and
a first joint connecting the first limb segment to the second limb segment in an in-line joint configuration such that when the first limb segment and the second limb segment are fully extended then an axial centerline of the first limb segment aligns with an axial centerline of the second limb segment, wherein the first joint comprises a first dual-reduction Quasi-Quasi-Direct-Drive (QQDD) joint actuator and wherein each reduction of the dual-reduction QQDD has a reduction in a range between 10:1 and 100:1, and wherein the first joint further comprises a wire pass-through comprising a hollow shaft at each end of the first joint.

2. The apparatus of claim 1, wherein the first limb segment comprises one or more dual-reduction QQDD's.

3. The apparatus of claim 1, wherein:
the first dual-reduction QQDD joint actuator comprises at least one torque-dense motor, a wire pass-through, and an absolute encoder.

4. The apparatus of claim 1, wherein the robotic limb further comprises one or more joint encoders and one or more reductions.

5. The apparatus of claim 1, further comprising a mounting base coupled to the first limb segment by a preliminary joint, wherein the preliminary joint comprises a mounted dual-reduction QQDD joint actuator.

6. The apparatus of claim 5, wherein the mounted dual-reduction QQDD joint actuator comprises at least one torque-dense motor, a wire pass-through, and an absolute encoder.

7. The apparatus of claim 1, wherein the robotic limb comprises at least one or more sensors configured to detect a position of the robotic limb.

8. The apparatus of claim 7, further comprising one or more processors and one or more computer-readable non-transitory storage media coupled to one or more of the processors, the one or more computer-readable non-transitory storage media comprising instructions operable when executed by one or more of the processors to cause the apparatus to perform operations comprising:
determining a current position of the portion of the robotic limb based on at least data from the one or more sensors; and
providing a positional adjustment for the robotic limb from the current position to a goal position.

9. An apparatus comprising:
a robotic limb, comprising:
a first limb segment;
a second limb segment;
a first joint connecting the first limb segment to the second limb segment in an in-line joint configuration such that when the first limb segment and the second limb segment are fully extended then an axial centerline-passing in a straight line through the first limb segment's entire length aligns with an axial centerline passing in a straight line through the second limb segment's entire length, wherein the first joint comprises a first dual-reduction Quasi-Quasi-Direct-Drive (QQDD) joint actuator and wherein each reduction of the dual-reduction QQDD has a reduction in a range between 10:1 and 100:1; and
a third limb segment, connected to the second limb segment by a second joint, wherein the second joint comprises a second dual-reduction QDDD joint actuator.

10. The apparatus of claim 9, wherein the first joint further comprises a wire pass-through comprising a hollow shaft at each end of the first joint.

11. The apparatus of claim 9, wherein the first limb segment comprises one or more dual-reduction QQDD's.

12. The apparatus of claim 1, wherein the first dual-reduction QQDD joint actuator comprises at least one torque-dense motor, a wire pass-through, and an absolute encoder.

13. The apparatus of claim 9, wherein the robotic limb further comprises one or more joint encoders and one or more reductions.

14. The apparatus of claim 9, further comprising a mounting base coupled to the first limb segment by a preliminary joint, wherein the preliminary joint comprises a mounted dual-reduction QQDD joint actuator.

15. The apparatus of claim 14, wherein the mounted dual-reduction QQDD joint actuator comprises at least one torque-dense motor, a wire pass-through, and an absolute encoder.

16. The apparatus of claim 9, wherein the second dual reduction QQDD joint actuator comprises at least one torque-dense motor, a wire pass-through, and an absolute encoder.

17. The apparatus of claim 9, wherein the robotic limb comprises at least one or more sensors configured to detect a position of the robotic limb.

18. The apparatus of claim 9, further comprising one or more processors and one or more computer-readable non-transitory storage media coupled to one or more of the processors, the one or more computer-readable non-transitory storage media comprising instructions operable when executed by one or more of the processors to cause the apparatus to perform operations comprising:
determining a current position of the portion of the robotic limb based on at least data from the one or more sensors; and
providing a positional adjustment for the robotic limb from the current position to a goal position.

* * * * *